(12) United States Patent
Schippers et al.

(10) Patent No.: US 10,955,076 B2
(45) Date of Patent: Mar. 23, 2021

(54) HIGH-PRESSURE RESISTANT SCREW CONNECTION FOR PIPE OR HOSE LINES WITH A TAPERED THREAD

(71) Applicant: PARKER HANNIFIN MANUFACTURING GERMANY GMBH & CO. KG, Bielefeld (DE)

(72) Inventors: Carsten Schippers, Bielefeld (DE); Thomas Müller, Gütersloh (DE); Oliver Neiske, Verl (DE); Andreas Udhöfer, Gütersloh (DE)

(73) Assignee: Parker Hannifin Manufacturing Germany GmbH & Co. KG, Bielefeld (DE)

( * ) Notice: Subject to any disclaimer, the term of this patent is extended or adjusted under 35 U.S.C. 154(b) by 371 days.

(21) Appl. No.: 15/581,474

(22) Filed: Apr. 28, 2017

(65) Prior Publication Data
US 2017/0268706 A1 Sep. 21, 2017

Related U.S. Application Data

(63) Continuation of application No. 14/009,183, filed as application No. PCT/EP2012/055817 on Mar. 30, 2012, now abandoned.

(30) Foreign Application Priority Data

Apr. 1, 2011 (DE) ...................... 10 2011 015 895.2

(51) Int. Cl.
*F16L 19/06* (2006.01)
*F16L 19/02* (2006.01)
(Continued)

(52) U.S. Cl.
CPC ........... *F16L 19/063* (2013.01); *F16L 19/028* (2013.01); *F16L 19/0218* (2013.01); *F16L 19/12* (2013.01)

(58) Field of Classification Search
CPC .... F16L 19/063; F16L 19/028; F16L 19/0218
(Continued)

(56) References Cited

U.S. PATENT DOCUMENTS 904,673 A 11/1908 Bideker
2,033,409 A 3/1936 Wilkinson
(Continued)

FOREIGN PATENT DOCUMENTS

CN 1386997 A 12/2002
CN 1969142 A 5/2007
(Continued)

OTHER PUBLICATIONS

International Search Report for corresponding Patent Application No. PCT/EP2012/055817 dated Jun. 14, 2012.

*Primary Examiner* — David Bochna
(74) *Attorney, Agent, or Firm* — Renner, Otto, Boisselle & Sklar, LLP

(57) ABSTRACT

A connecting device for pipelines or hose lines with a threaded body and with a pipe-like end piece which can be inserted into a receptacle formed on the threaded body and which can be fitted therein by means of a swivel nut screwed onto the threaded body, wherein the receptacle of the threaded body has the shape of a widening cone and the circumferential surface of the end piece that engages in the receptacle has a conical design, is characterized in that the circumferential surface (12) of the threaded body (10) that bears the external thread (30) has, in the direction of the front end of said surface, an inclined profile directed opposite to the cone of the receptacle (11), and the swivel nut (17) has, with its surface (18) bearing the internal thread (31), a profile complementary thereto, and the external thread (30) and internal thread (31) are designed as tapered threads in such a way that a radial force emanating from the tapered thread with the swivel nut (17) screwed on is directed
(Continued)

opposite to the radial force exerted, with the connecting device mounted, by the conical end piece (13) onto the receiving cone (11) formed in the threaded body (10).

16 Claims, 4 Drawing Sheets

(51) Int. Cl.
*F16L 19/028* (2006.01)
*F16L 19/12* (2006.01)

(58) Field of Classification Search
USPC .................................................. 285/354, 247
See application file for complete search history.

(56) References Cited

U.S. PATENT DOCUMENTS

| | | | | |
|---|---|---|---|---|
| 2,477,677 | A | * | 8/1949 | Woodling ............. F16L 19/028 285/281 |
| 2,532,669 | A | * | 12/1950 | Jones .................. F16L 27/0824 285/106 |
| 2,748,463 | A | * | 6/1956 | Mueller ................ F16L 19/028 29/523 |
| 3,079,181 | A | * | 2/1963 | Van Der Wissel ... E21B 17/042 285/333 |
| 3,438,655 | A | | 4/1969 | Campbell |
| 3,691,604 | A | | 9/1972 | Spontelli |
| 4,346,920 | A | * | 8/1982 | Dailey ................. F16L 15/001 175/297 |
| 4,469,356 | A | * | 9/1984 | Duret .................... B21D 39/04 285/332 |
| 4,475,748 | A | * | 10/1984 | Ekman ................ F16L 19/0206 285/12 |
| 4,629,223 | A | * | 12/1986 | Dearden .............. E21B 17/042 285/334 |
| 4,770,448 | A | | 9/1988 | Strickland et al. |
| 4,802,695 | A | | 2/1989 | Weinhold |
| 5,060,988 | A | | 10/1991 | Williamson |
| 5,494,320 | A | * | 2/1996 | Cerruti ................ F16L 19/0225 285/332 |
| 5,954,375 | A | | 9/1999 | Trickle |
| 6,089,623 | A | * | 7/2000 | Schroeder .......... F16L 19/0286 285/353 |
| 6,155,613 | A | * | 12/2000 | Quadflieg ............ F16L 15/001 285/334 |
| 6,431,613 | B1 | | 8/2002 | Altenrath |
| 6,454,315 | B1 | | 9/2002 | Yamaguchi |
| 6,598,908 | B1 | | 7/2003 | Wosik |
| 7,000,953 | B2 | | 2/2006 | Berghaus |
| 7,195,288 | B2 | | 3/2007 | Weinhold |
| 7,452,007 | B2 | * | 11/2008 | Hashem ................ E21B 43/103 166/207 |
| 7,661,728 | B2 | * | 2/2010 | Verger ................ E21B 17/0423 285/334 |
| 8,181,998 | B2 | * | 5/2012 | Watts .................... F16L 15/004 285/334 |
| 9,797,532 | B2 | * | 10/2017 | Makino ................ B21D 17/025 |
| 2002/0148128 | A1 | | 10/2002 | Williams et al. |
| 2002/0162984 | A1 | | 11/2002 | Rosas |
| 2010/0140920 | A1 | | 6/2010 | Kloss et al. |

FOREIGN PATENT DOCUMENTS

| | | |
|---|---|---|
| CN | 101573550 A | 11/2009 |
| DE | 37 09 819 A1 | 11/1987 |
| DE | 10 2005 05440 | 5/2007 |
| DK | 112 060 | 11/1968 |
| EP | 0286568 B1 | 10/1988 |
| EP | 1260750 A1 | 11/2002 |
| EP | 2184525 | 5/2010 |
| JP | S61-010072 | 1/1986 |
| JP | H02-080886 | 3/1990 |
| JP | 2001-056075 | 2/2001 |
| JP | 2010-031941 | 2/2010 |
| JP | 2010-509548 | 3/2010 |
| WO | 2008/057983 | 5/2008 |

\* cited by examiner

HIGH-PRESSURE RESISTANT SCREW CONNECTION FOR PIPE OR HOSE LINES WITH A TAPERED THREAD

This application is a continuation of U.S. patent application Ser. No. 14/009,183 filed Dec. 16, 2013, abandoned, which is a U.S. National Phase of International Application No. PCT/EP2012/055817 filed Mar. 30, 2012, which claims priority to German Patent Application No. 10 2011 015 895.2 filed Apr. 1, 2011, which are all hereby incorporated herein by reference in their entirety.

DESCRIPTION

The invention relates to a connecting device for pipe or hose lines with a threaded connecting body having a bore for passing through a medium flowing through the pipe or hose line and with a pipe-like end piece which can be plugged into a receptacle constructed at the front end of the threaded connection body and can be fixed therein by means of a union nut which has an internal thread, which can be screwed onto an external thread applied on the outer circumference of the threaded connection body, and is arranged rotatably between a release position and an installed position, wherein the receptacle of the threaded connection body is constructed in the form of an expanding cone and the circumferential surface of the end piece engaging into the receptacle has a conical shape corresponding to the receiving cone constructed on the threaded connection body and tapering to the end of the end piece.

BACKGROUND

A generic connecting device is known from DD 204 059 A1. Here, the external thread constructed on the threaded connection body and the associated internal thread constructed in the union nut are in each case constructed as a cylindrical thread, so that the circumferential surface of the threaded connection body carrying the external thread has a course parallel to the longitudinal axis of the connecting device. The receptacle of the threaded connection body accommodating the end piece has the shape of a cone expanding outwardly towards the end piece to be plugged in, preferably in the form of a so-called 24° cone. To produce corresponding bearing surfaces between the threaded connection body and end piece, the end piece is constructed with a conicity corresponding to the receiving cone of the threaded connection body in the region to be pushed into the receiving cone of the threaded connection body.

The known connecting device is connected with the disadvantage that when installing, owing to the cylindrical thread, the union nut must initially be screwed for a plurality of rotations onto the threaded connection body before it is tightened with a suitable tool until a predetermined torque in the final installation position is reached. Installation of this type is troublesome and difficult to carry out, particularly in the case of connecting devices to be arranged in regions which are difficult to access. A further disadvantage can be seen in the fact that in the event of too strong a tightening of the union nut, the end piece pushed into the receiving cone of the threaded connection body with a corresponding axial force seeks to widen the receiving cone of the threaded connection body with respect to the cylindrical bearing surface of the union nut screwed onto the cylindrical external thread constructed on the threaded connection body with a cylindrical internal thread, so that corresponding damage of the threaded connection body or the union nut and leakiness of the pipe connection connected therewith may result.

SUMMARY OF THE INVENTION

The invention is therefore based on the object of simplifying the installation of a generic connecting device and also avoiding the previously mentioned disadvantages in the process.

The achievement of this object including advantageous embodiments and developments results from the content of the patent claims, which follow this description.

In terms of its basic idea, the invention provides that the circumferential surface of the threaded connection body carrying the external thread has a course in the direction of its front end which is inclined oppositely to the cone of the receptacle and the union nut has a course complementary thereto on its surface carrying the internal thread, and external thread and internal thread are constructed as tapered threads such that in the case of installed connecting device, radial force exerted by the conical end piece onto the receiving cone constructed in the threaded connection body is directed oppositely to a radial force emanating from the tapered thread with the union nut screwed on.

The advantage of a simple installation is connected with the invention to the extent that when the union nut can initially be pushed over the first thread turns of the external thread constructed on the threaded connection body without a rotational movement owing to the tapered thread used according to the invention, wherein the conical geometry of the thread acts as a centering aid. Subsequently, only a maximum of two rotations are necessary before a tightening of the screw takes place. A further advantage consists in the fact that owing to the course, which is connected with the use of the conical geometry, of the surfaces of the threaded connection body and union nut carrying the thread turns in the form of a cone tapering towards the end piece to be pushed in, the forces exerted radially outwardly by the end piece pushed into the receiving cone of the threaded connection body during the final installation of the connecting device face radially inwardly directed reaction forces correspondingly emanating from the conical screw connection, which additionally likewise increase with growing connecting force of the end piece in the threaded connection body. Thus, a widening of the receiving cone at the threaded connection body cannot start, so that the safety and also the leak-tightness of the connecting device according to the invention are improved.

To the extent that the front end region of the end piece is to be executed with a conicity corresponding to the receiving cone of the threaded connection body, this can take place by flanging or turning the end piece of a pipe or by welding or soldering end pieces having correspondingly conical bearing surfaces on a pipe or the attachment thereof on a hose or the arrangement of cutting rings having correspondingly conical bearing surfaces and known in principle for example from DE 40 38 539 C1 in the interior of the connecting screw connection.

According to an exemplary embodiment of the invention, it is provided that the tapered thread is constructed as a conical apex thread.

In an alternative embodiment of the invention, provision is made for the tapered thread to be constructed as a thread having a trapezoidal profile with flattened thread flanks. A trapezoidal thread of this type has a larger pitch and fewer rotations are therefore required during installation compared to a conical apex thread.

According to an advantageous embodiment of the invention, provision is made for the geometry of the tooth flanks of the tapered thread to be designed in such a manner that when reaching an installation position of the union nut on the threaded connection body defined by a predetermined tightening torque, during initial installation a gap remains between the tooth flanks of external thread and internal thread placed in the screwing direction and also in the respective thread root in each case as retightening reserve of the tapered thread. An overload protection against over assembly is initially connected with this. At the same time, the gap remaining during the first installation forms a retightening reserve which is required to the extent that the union nut is screwed some degree further onto the threaded connection body in the context of repeated installations of the connecting device to compensate settling phenomena and tolerances during the production of the thread. So that the union nut does not unintentionally loosen in the case of the installed connecting device, the loosening torque must not be too small. Insofar as an additional securing for establishing a self locking of the tapered thread is not provided, the flank angle of the tapered thread is to be chosen to be such that at least 60° of the tightening torque are required in order to release the connecting device again by rotating the union nut counter to the tightening direction of rotation.

Securing against unintentional loosening of the connecting device is achieved according to an exemplary embodiment of the invention in that the geometry of the tooth flanks of the tapered thread is designed in such a manner that before the installation position of the union nut defined by a predetermined tightening torque on the threaded connection body is reached, the respectively interacting tooth flanks of external thread and internal thread bear against one another and a gap remains in the respective thread root. In a design of the tapered thread of this type, the tooth flanks of external thread and internal thread already run together even before reaching the installation position, without contact being produced in the thread root. As the tooth flanks run together, the torque increases, as the thread profiles of external thread and internal thread are pushed into one another like wedges in each case. This causes a self locking of the tapered thread constructed on the screw connecting piece and union nut, but not to a punctiform block installation, in which the union nut is not allowed to be rotated further on the threaded connection body. By contrast, the necessary torque for loosening the connecting device is increased considerably, as a result of which the self locking is ensured.

According to another exemplary embodiment for establishing a self locking, provision can be made for the external thread to be constructed on the threaded connection body and the internal thread constructed in the union nut to have a mutually different thread pitch in each case. When designing the tapered thread with slightly differing thread pitches, the degree and the force/moment curve of the desired self locking of threaded connection body to union nut is variable. If one chooses a slightly larger thread pitch on the threaded connection body compared to the union nut in accordance with an exemplary embodiment of the invention, a thread locking wedge action begins only over the respectively first and last thread pitch. The size of the deviation in the thread pitch in this case describes the size of the contact surfaces and the action of self locking resulting thereby. In addition, the tensile loading caused by the prevailing pipe internal pressure during operation and acting on the thread flanks of the tapered thread can be displaced onto the larger rear thread diameter in the tapered thread.

An in turn alternative embodiment of a self locking of the tapered thread is characterised according to an exemplary embodiment of the invention in that the thread turns of the external thread applied on the threaded connection body and the internal thread constructed in the union nut have a different opening angle of their tooth flanks. If, for example according to an exemplary embodiment of the invention, one chooses a larger opening angle for the tooth flanks of the thread turns on the union nut than in the region of the threaded connection body, then this effects a locking of the tapering thread at the front end of the threaded connection body in the union nut, as the different opening angles meet. The further thread turns in the rear course of the thread remain uncontacted.

A self locking of the tapered thread before reaching a block installation state can be strengthened according to an exemplary embodiment in that the tightening torque defining the final installation state of the connecting device is set up in such a manner that the end section of the threaded connection body lying between the receiving cone and the external circumferential surface carrying the external thread is elastically inwardly pretensioned towards the end piece pushed into the receiving cone. Here, the recommended torque for achieving the final installation position of the connecting device is chosen such that in the case of the meeting of the different opening angles of the thread turns, the open end section of the threaded connection body is reduced slightly in terms of its diameter, that is to say is elastically pushed inwards. On its inner side, the end section in this case experiences support due to the likewise conical end of the end piece pushed into the receiving cone. As a result, a self locking in the form of a circumferential wedge between the end piece and the union nut is created, as a result of which the loosening torque of the connecting device is increased.

An in turn alternative design of the self locking in the case of a tapered thread is achieved according to an exemplary embodiment of the invention in that the external thread applied on the threaded connection body has a larger axial length than the internal thread constructed in the union nut. Thus, when reaching the final installation position and retaining the predetermined tightening torque, the components run into one another somewhat. This leads to a deformation and jamming/self locking of the components. Such a jamming can be both plastic and elastic, that is to say the self locking of the tapered thread can only start during the initial installation of the connecting device or else also become effective in the case of repeated installations and thus additionally increase the loosening torque.

With regards to an improvement of the sealing of between the end piece and threaded connection body, provision is made according to an exemplary embodiment of the invention for a groove with a seal arranged therein to be constructed in the internal surface of the receiving cone of the threaded connection body accommodating the conical region of the end piece.

BRIEF DESCRIPTION OF THE DRAWINGS

Exemplary embodiments of the invention are reproduced in the drawing, which are described in the following. In the figures.

DETAILED DESCRIPTION

Figure 1:
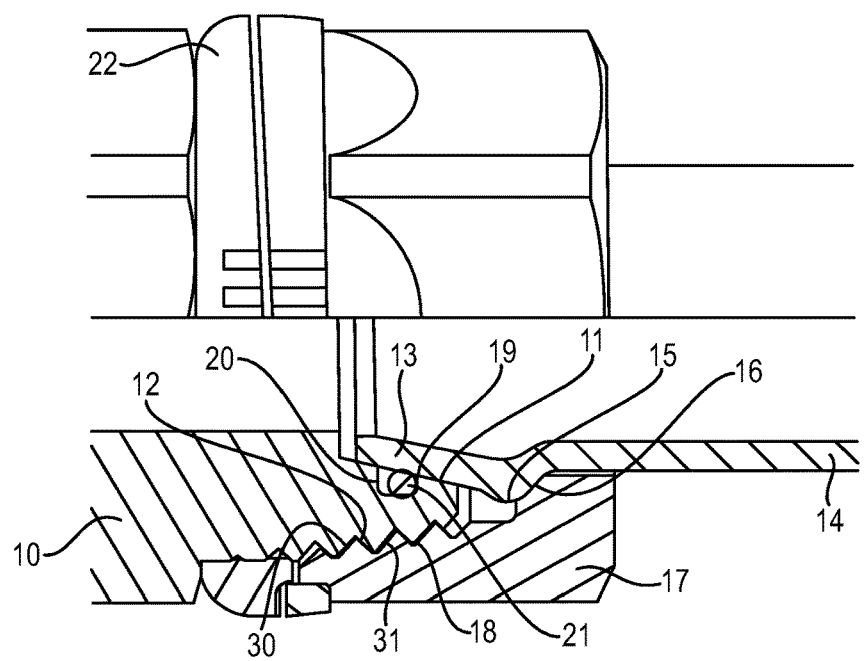
FIG. 1 shows a connecting device with a connecting body and an end piece plugged into the same and also a union nut fixed on the connecting body by means of a tapered thread constructed as a conical apex thread in the state of final installation in a partially cut away side view.

The connecting device, which can initially be seen from FIG. 1, consists of a threaded connection body 10, which has a receiving cone 11 at its front (right) end for accommodating an end piece 13 plugged therein, wherein the receiving cone 11 has the shape of an expanding cone. The external circumferential surface 12 of the threaded connection body located in the region of the receiving cone 11 has an opposite inclined course in the direction of its front end to the cone of the receiving cone 11, wherein an external thread 30 is constructed on this circumferential surface 12.

The end piece 13 plugged into the receiving cone 11 of the threaded connection body 10 is an integral constituent of a pipe 14, wherein a bead 15 is produced by means of a corresponding reshaping at the end piece 13 or the pipe 14. The bead 15 on the one hand constructs a support surface 16, at its end facing away from the threaded connection body 10, for a union nut 17 pushed over the pipe 14, and at the same time, the front circumferential surface of the end piece 13 is constructed as a conical surface 19 which has a conicity corresponding to the conicity of the receiving cone 11 on the threaded connection body 10. The union nut pushed over the pipe 14 and supported on the support surface 16 of the pipe bead 15 has a conically expanding internal surface 18 in its interior, on which an internal thread 31 is constructed. External thread 30 of the threaded connection body 10 and internal thread 31 of the union nut 17 together form a tapered thread with a corresponding thread pitch owing to the conicity of circumferential surface 12 and internal surface 18 respectively, which are set up to match. In the exemplary embodiment illustrated in FIG. 1, the tapered thread is constructed as a conical apex thread.

To seal the end piece 13 with respect to the threaded connection body 10, a groove 20 with a sealing ring 21 inserted therein is constructed on the inner circumferential surface of the receiving cone 11. Further, an indicator ring 22 is also illustrated on the external circumference of the threaded connection body, by means of which the installation state of the connecting device can be made discernible. It is not necessary to know the construction and function of the indicator ring in connection with the present invention.

Figure 2:
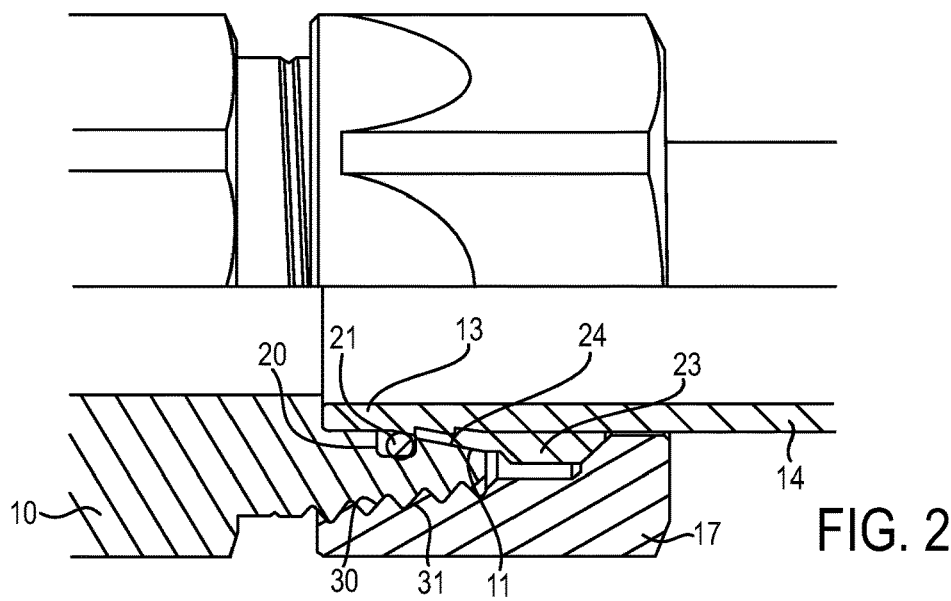
FIG. 2 shows the connecting device according to FIG. 1 in a different embodiment.

Insofar as a slightly modified configuration of the invention is illustrated in FIG. 2, the difference consists in the fact that the end piece 13 is constructed cylindrically with connecting pipe 14, wherein a cutting ring 23 is attached on the external circumference of the end piece 13 plugged into the receiving cone 11, which cutting ring then constructs, on the external circumference thereof, the conical bearing surface 24 against the receiving cone 11 of the threaded connection body 10 corresponding thereto. The arrangement of a cutting ring of this type is known in principle from DE 40 38 539 C1.

Figure 3:
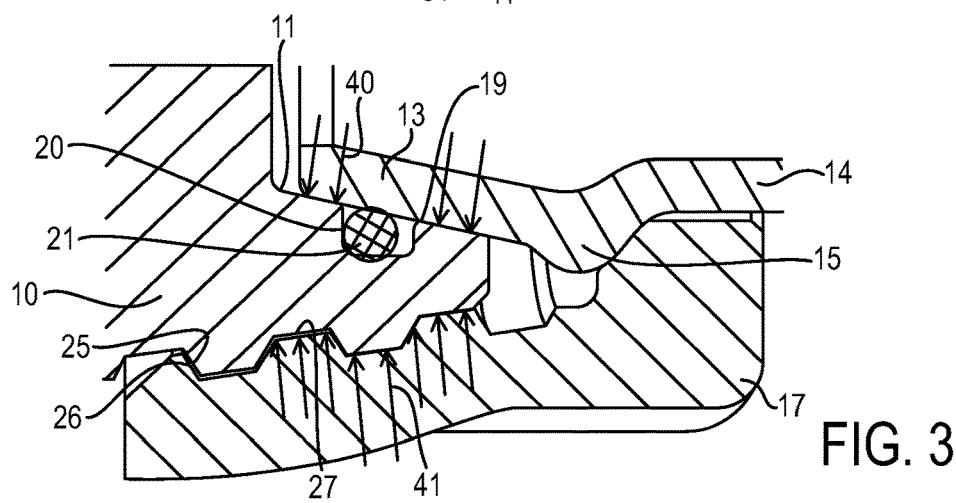
FIG. 3 shows an alternative embodiment of the tapered thread called upon for connecting the threaded connection body and union nut as so-called trapezoidal thread in a partially cut away side view.

It can be seen from both exemplary embodiments that it is essential for the realisation of the invention that a conical surface for bearing on the receiving cone 11 is constructed in the region of the end piece 13 plugged into the receiving cone 11 of the threaded connection body 10. The constructive shape in which this conical surface is individually produced or constructed is irrelevant for the realisation of the connecting device according to the invention. Insofar as the construction of a tapered thread used as screw connection is illustrated as a conical apex thread in the previously explained FIGS. 1 and 2, a tapered thread constructed as a trapezoidal thread, as is illustrated in FIG. 3, is also suitable in the same way.

The important advantage of the invention, according to which the union nut 17 can initially be pushed without a rotational movement over the first thread turns of the external thread 30 constructed on the threaded connection body 10 wherein the cone geometry of the thread acts as an aid to centring, results already from the previously described design of a connecting device with a tapered thread constructed thereon. Subsequently, only a few, for example a maximum of two rotations are necessary before a tightening of the screw takes place. Furthermore, the further advantage of the invention is clarified in FIG. 3, according to which the forces exerted radially outwardly (arrows 40) by the end piece 13 pushed into the receiving cone 11 of the threaded connection body 10 during the final installation of the connecting device face inwardly directed reaction forces (arrows 41) emanating from the conical screw connection, which likewise increase with growing connecting force of the end piece 13 in the threaded connection body 10.

Figure 4:
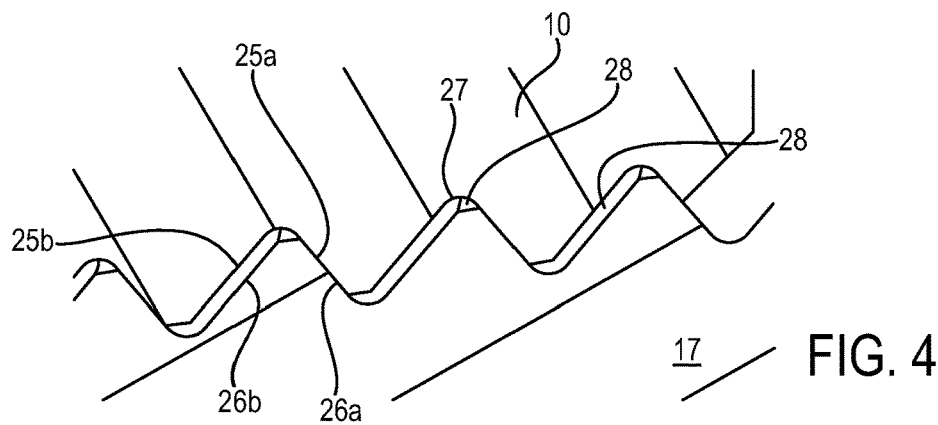
FIG. 4 shows the thread profile constructed as conical apex thread of the external thread applied on the threaded connection body and the internal thread located in the union nut when engaging in the final installation position according to FIGS. 1 and 2 in an enlarged side view.
Figure 5:
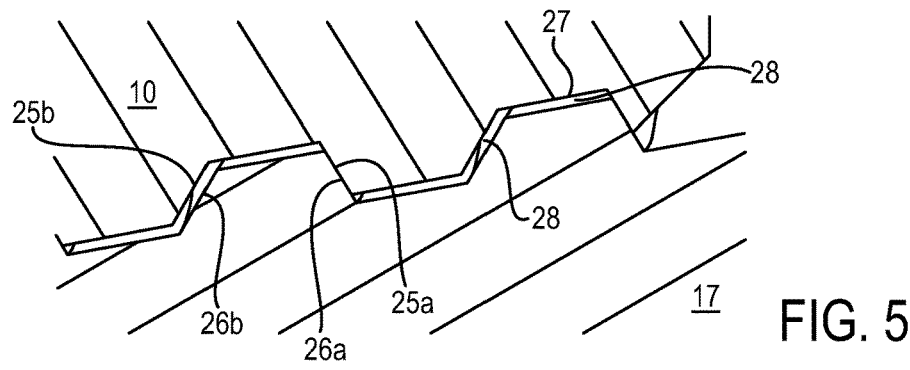
FIG. 5 shows the trapezoidal thread according to FIG. 3 in an illustration according to FIG. 4.

In FIGS. 4 and 5, the construction of both a conical apex thread and a trapezoidal thread is illustrated with a protection against over assembly or a retightening reserve. To this end, the respective thread turns of the internal thread 31 of the union nut 17 and external thread 30 of the threaded connection body 10 are configured in such a manner in terms of design that in the installed state, the tooth flanks 25a of the external thread 30 and tooth flanks 26a of internal thread 31 placed in the screwing direction bear against one another, wherein a gap 28 remains in each case at the opposite tooth flanks 25b or 26b and also in the thread root 27. This gap 28 in particular forms a retightening reserve which is required to the extent that the union nut 17 is screwed some degree further onto the threaded connection body 10 in the context of repeated installations of the connecting device.

The exemplary embodiments of the invention described in the further FIGS. 6 to 12 described below relate to the establishment of a self locking in the case of the tapered thread used, the realisation thereof on the basis of a tapered thread constructed as trapezoidal thread is explained. The correspondingly explained design configurations of the trapezoidal thread can however likewise be constructed in the case of conical apex threads, without this being illustrated or explained in detail.

Figure 6:
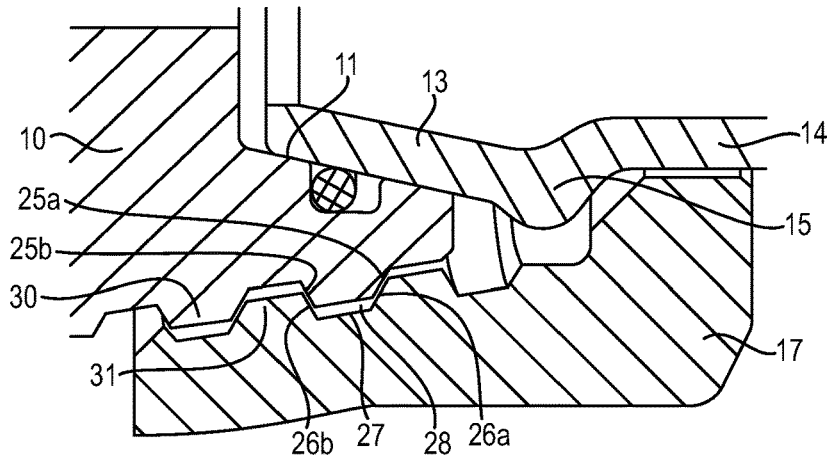
FIG. 6 shows the trapezoidal thread of threaded connection body and union nut set up for a self locking by means of mutually bearing tooth flanks before reaching the installation position.
Figure 7:
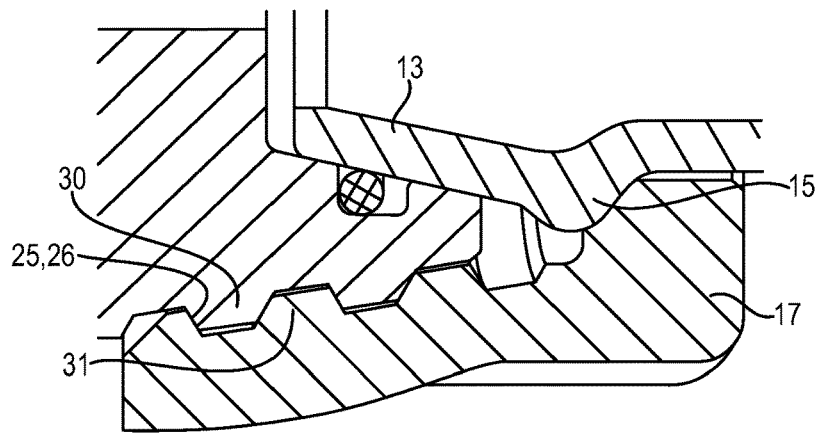
FIG. 7 shows the trapezoidal thread according to FIG. 6 in the installation position of threaded connection body and union nut.

In the exemplary embodiment illustrated in FIGS. 6 and 7, the self locking of the trapezoidal thread constructed on the threaded connection body 10 and union nut 17 in each case is realised in that the geometry of the respective tooth flanks 25 and 26 of the interacting thread turns is designed in such a manner that in the installation position, the tooth flanks 25 and 26 bear against one another and a gap 28 remains in turn in the respective thread root 27. It emerges from a comparison of FIGS. 6 and 7 that in the installation position illustrated in FIG. 7, the respectively mutually adjacent tooth flanks 25a and 26a on the one hand and 25b and 26b on the other hand bear against one another, leaving a gap 28 in the thread root 27. Insofar as thread profiles of external thread 30 and internal thread 31 have pushed into one another like wedges in each case during the installation, the torque increases owing to the running together of the tooth flanks 25 and 26 connected therewith, which leads to the desired self locking.

Figure 8:
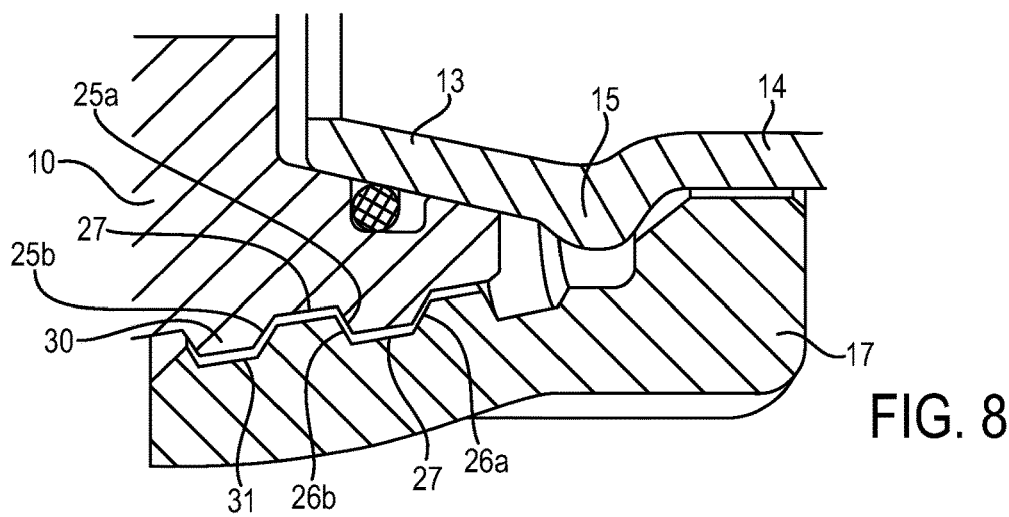
FIG. 8 shows the trapezoidal thread applied on threaded connection body and union nut for a self locking by means of different thread pitch thereof before reaching the installation position.
Figure 9:
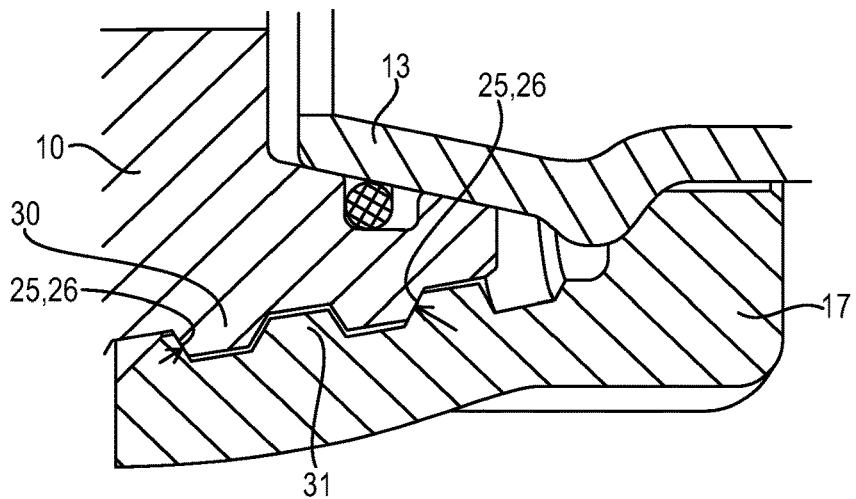
FIG. 9 shows the trapezoidal thread according to FIG. 8 in the installation position.

In the exemplary embodiment illustrated in FIGS. 8 and 9, the self locking of the trapezoidal thread constructed on the threaded connection body 10 and union nut 17 in each case is realised in that the external thread 30 constructed on the threaded connection body 10 and the internal thread 31 constructed in the union nut 17 have a mutually different thread pitch in each case. As can be seen to this end from FIG. 9, in the case of a slightly larger thread pitch constructed on the threaded connection body, a thread locking wedge action occurs only over the respectively first and last thread turn. The tooth flanks of external thread 30 and internal thread 31 lying therebetween remain uncontacted.

Figure 10:
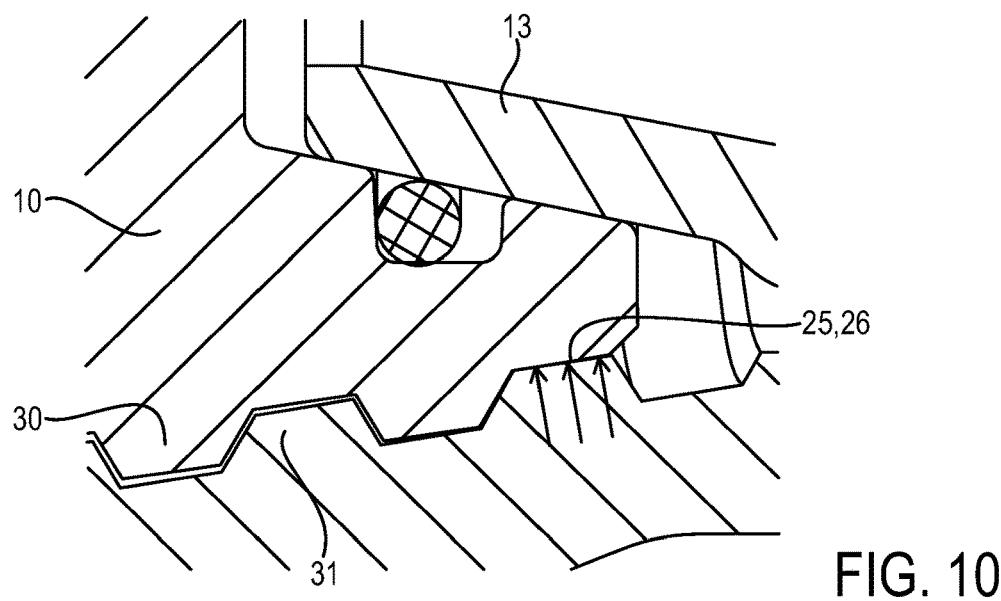
FIG. 10 shows the trapezoidal thread provided on threaded connection body and union nut for a self locking by means of different opening angle of the tooth flanks thereof in the installation position of the connecting device.

An in turn alternative design of the self locking of the trapezoidal thread illustrated by way of example emerges from FIG. 10. Here, external thread 30 and internal thread 31 in each case have a differently sized opening angle of their tooth flanks 25a, 25b and 26a, 26b respectively. If one chooses an opening angle of for example 12° for the internal thread 31 constructed on the union nut 17 and an opening angle of 11° for the external thread 30 constructed on the threaded connection body 10, then this effects a locking of the respectively tapering thread only at the front end of the threaded connection body 10 reaching into the interior of the union nut 17, as here the thread turns constructed with different opening angles meet. The further thread turns in the course of the rear screw connection remain uncontacted.

Figure 11:
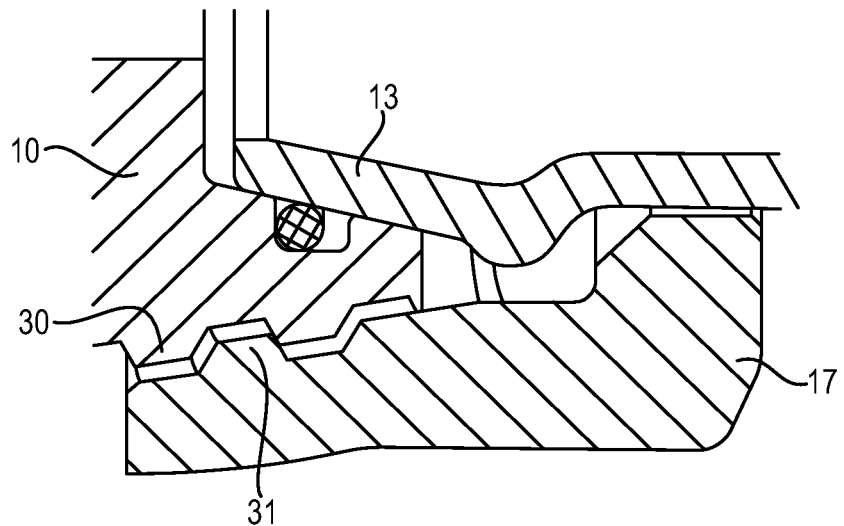
FIG. 11 shows tapered thread set up for a self locking by means of different lengths of the trapezoidal thread applied on threaded connection body and union nut, before reaching the installation position.
Figure 12:
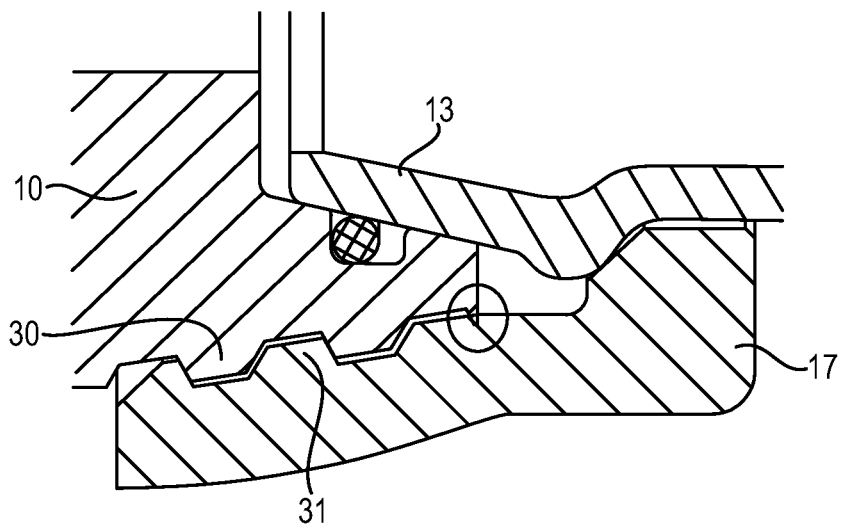
FIG. 12 shows the trapezoidal thread according to FIG. 11 in the installation position of the connecting device.

In the exemplary embodiment finally illustrated in FIGS. 11 and 12, the self locking is realised in that the external thread 30 applied on the threaded connection body 10 has a larger axial length than the internal thread 31 constructed in the union nut 17. Thus, when the final installation position is reached, a partial running together of the thread turns takes place, which leads to a deformation and locking or self locking of the components against one another.

The features of the subject of these documents disclosed in the previous description, the patent claims, the abstract and the drawing may be important individually and in any desired combinations with one another, for the realisation of the invention in its various embodiments.

The invention claimed is:

1. A connecting device for pipe or hose lines, comprising a threaded connection body having a bore,
an end piece which can be plugged into a receptacle provided at the front end of the threaded connection body, and
a union nut for fixing the end piece in the threaded connection body, the union nut having an internal tapered thread such that the union nut can be screwed onto an external tapered thread on an outer circumference of the threaded connection body, and the union nut being rotatable on the threaded connection body between a release position and an installed position, and
wherein the receptacle of the threaded connection body has an interior surface of progressively decreasing diameter and the end piece has a circumferential surface engaging into the receptacle, the circumferential surface having a progressively increasing diameter for engaging the interior surface of the receptacle,
wherein the geometry of tooth flanks of the internal and external tapered threads is configured such that when the union nut is in the installed position determined by a predetermined tightening torque, the tooth flanks on opposite sides of the external tapered thread and corresponding tooth flanks of the internal tapered thread bear against one another over at least one turn of the external tapered thread;
wherein the internal and external tapered threads circumscribe the circumferential surface engaging into the receptacle, and
wherein the threaded connection body has a leading axial end face radially outwardly disposed from the interior surface of the receptacle, and the leading axial end face is axially spaced apart from any axially opposing surface of the end piece when the union nut is in the installed position determined by the predetermined tightening torque.

2. The connecting device according to claim 1, wherein the external tapered thread on the threaded connection body and the internal tapered thread on the union nut have mutually different thread pitches.

3. The connecting device according to claim 2, wherein the external tapered thread has a thread pitch larger than the thread pitch of the internal tapered thread.

4. The connecting device according to claim 1, wherein the geometry of tooth flanks of the internal and external tapered threads is configured such that when the union nut is in the installed position determined by the predetermined tightening torque, a gap remains between a thread root of the external tapered thread and a corresponding apex of the internal tapered thread over at least a portion of the external and internal tapered threads.

5. The connecting device according to claim 1, wherein the end piece has a support surface facing away from the threaded connection body that is axially engaged by the union nut for urging the end piece towards the threaded connection body when the union nut is screwed onto the threaded connection body.

6. The connecting device according to claim 5, wherein the support surface is formed by a bead on the end piece.

7. The connecting device according to claim 1, wherein the end piece is formed by an end portion of the pipe or hose line.

8. The connecting device according to claim 1, wherein the external tapered thread and internal tapered thread are tapered apex threads.

9. The connecting device according to claim 1, wherein the external tapered thread and internal tapered thread are threads having a trapezoidal profile in cross-section.

10. The connecting device according to claim 1, wherein the geometry of tooth flanks of the internal and external tapered threads is configured such that when the union nut is in the installed position determined by a predetermined tightening torque, the tooth flanks on opposite sides of the external tapered thread and corresponding tooth flanks of the internal tapered thread do not bear against one another over at least one turn of the external tapered thread.

11. A connecting device for pipe or hose lines, comprising
a threaded connection body having a bore,
an end piece which can be plugged into a receptacle provided at the front end of the threaded connection body, and
a union nut for fixing the end piece in the threaded connection body, the union nut having an internal tapered thread such that the union nut can be screwed onto an external tapered thread on an outer circumference of the threaded connection body, and the union nut being rotatable on the threaded connection body between a release position and an installed position, and
wherein the receptacle of the threaded connection body has an interior surface of progressively decreasing diameter and the end piece has a circumferential surface engaging into the receptacle, the circumferential surface having a progressively increasing diameter for engaging the interior surface of the receptacle,
wherein the geometry of tooth flanks of the internal and external tapered threads is configured such that when the union nut is in the installed position determined by a predetermined tightening torque, the tooth flanks on opposite sides of the external tapered thread and corresponding tooth flanks of the internal tapered thread bear against one another over at least one turn of the external tapered thread; and
wherein thread turns of the external tapered thread and the internal tapered thread have mutually different opening angles of the tooth flanks.

12. The connecting device according to claim 11, wherein the tooth flanks of the internal tapered thread have larger opening angle than the tooth flanks of the external tapered thread.

13. A connecting device for pipe or hose lines, comprising
a threaded connection body having a bore,
an end piece which can be plugged into a receptacle provided at the front end of the threaded connection body, and
a union nut for fixing the end piece in the threaded connection body, the union nut having an internal tapered thread such that the union nut can be screwed onto an external tapered thread on an outer circumference of the threaded connection body, and the union nut being rotatable on the threaded connection body between a release position and an installed position, and
wherein the receptacle of the threaded connection body has an interior surface of progressively decreasing diameter and the end piece has a circumferential surface engaging into the receptacle, the circumferential surface having a progressively increasing diameter for engaging the interior surface of the receptacle,
wherein the geometry of tooth flanks of the internal and external tapered threads is configured such that when the union nut is in the installed position determined by a predetermined tightening torque, the tooth flanks on opposite sides of the external tapered thread and corresponding tooth flanks of the internal tapered thread bear against one another over at least one turn of the external tapered thread; and
wherein the external tapered thread has an axial length larger than the internal tapered thread.

14. A connecting device for pipe or hose lines, comprising
a threaded connection body having a bore,
an end piece which can be plugged into a receptacle provided at the front end of the threaded connection body, and
a union nut for fixing the end piece in the threaded connection body, the union nut having an internal tapered thread such that the union nut can be screwed onto an external tapered thread on an outer circumference of the threaded connection body, and the union nut being rotatable on the threaded connection body between a release position and an installed position, and
wherein the receptacle of the threaded connection body has an interior surface of progressively decreasing diameter and the end piece has a circumferential surface engaging into the receptacle, the circumferential surface having a progressively increasing diameter for engaging the interior surface of the receptacle,
wherein the geometry of tooth flanks of the internal and external tapered threads is configured such that when the union nut is in the installed position determined by a predetermined tightening torque, the tooth flanks on opposite sides of the external tapered thread and corresponding tooth flanks of the internal tapered thread bear against one another over at least one turn of the external tapered thread;
wherein the internal and external tapered threads circumscribe the circumferential surface engaging into the receptacle, and
wherein a groove with a seal arranged therein is provided in the internal surface of the receptacle.

15. A connecting device for pipe or hose lines, comprising
a threaded connection body having a bore,
an end piece which can be plugged into a receptacle provided at the front end of the threaded connection body, and
a union nut for fixing the end piece in the threaded connection body, the union nut having an internal tapered thread such that the union nut can be screwed onto an external tapered thread on an outer circumference of the threaded connection body, and the union nut being rotatable on the threaded connection body between a release position and an installed position, and
wherein the receptacle of the threaded connection body has an interior surface of progressively decreasing diameter and the end piece has a circumferential surface engaging into the receptacle, the circumferential surface having a progressively increasing diameter for engaging the interior surface of the receptacle,
wherein the geometry of tooth flanks of the internal and external tapered threads is configured such that when the union nut is in the installed position determined by a predetermined tightening torque, the tooth flanks on opposite sides of the external tapered thread and corresponding tooth flanks of the internal tapered thread bear against one another over at least one turn of the external tapered thread;

wherein the internal and external tapered threads circumscribe the circumferential surface engaging into the receptacle, and wherein the circumferential surface of the end piece extends axially beyond a leading axial end of the threaded connection body when the union nut is in the installed position determined by the predetermined tightening torque.

16. The connecting device according to claim 15, wherein the geometry of tooth flanks of the internal and external tapered threads is configured such that when the union nut is in the installed position determined by a predetermined tightening torque, the tooth flanks on opposite sides of the external tapered thread and corresponding tooth flanks of the internal tapered thread do not bear against one another over at least one turn of the external tapered thread.

\* \* \* \* \*